United States Patent [19]

Kessels et al.

[11] Patent Number: 4,776,670

[45] Date of Patent: Oct. 11, 1988

[54] OPTICAL ASSEMBLY

[75] Inventors: Henricus M. M. Kessels; Francis J. Span, both of Eindhoven, Netherlands

[73] Assignee: U.S. Philips Corporation, New York, N.Y.

[21] Appl. No.: 130,364

[22] Filed: Dec. 8, 1987

[30] Foreign Application Priority Data

Dec. 8, 1986 [NL] Netherlands ............... 8603109

[51] Int. Cl.$^4$ .............................................. G02B 7/02
[52] U.S. Cl. .................................... 350/252; 350/253
[58] Field of Search .................................. 350/252–253, 350/318, 631

[56] References Cited

U.S. PATENT DOCUMENTS 1,987,058  1/1935  Fuller ................................. 350/318
2,513,723  7/1950  Greenwood et al. ............... 350/252

FOREIGN PATENT DOCUMENTS 53806  3/1984  Japan ................................... 350/631
1919  of 1912  United Kingdom ............... 350/252
1556476  11/1979  United Kingdom ............... 350/252

Primary Examiner—William H. Punter
Attorney, Agent, or Firm—F. Brice Faller

[57] ABSTRACT

An optical assembly comprises an elongate hollow body (11) of triangular cross-section, having three deformable side walls which adjoin each other and at least one optical element (1). Inside the body the optical element is secured without play to each of the side walls at a well-defined location and in a well-defined position by rigid local connections (15).

7 Claims, 2 Drawing Sheets

OPTICAL ASSEMBLY

BACKGROUND OF THE INVENTION

The invention relates to an optical assembly having retaining means and at least one optical element retained thereby.

Such an assembly, which may also be referred to as "optical device", is known from French Patent Specification No. 430,551. The known optical assembly is intended for use in projection apparatus and comprises two optical lenses and three leaf springs clamped between an inner and an outer ring. The leaf springs comprise hook-shaped end portions which engage around the lens peripheries in order to keep the lenses in a specific position relative to each other.

A drawback of the known assembly is that for retaining the lenses a large number of parts are required which are secured to each other in a specific position relative to one another. Further, it is to be noted that the lenses are retained by means of a clamping force, the clamping force of the leaf spring and the friction between the leaf springs and the lenses playing an essential part. Such a construction has the drawback that the friction which occurs gives rise to a specific positional inaccuracy. This inaccuracy, also referred to as "virtual play" by those skilled in the art, renders the known construction unsuitable for retaining optical elements at a predetermined location and in a predetermined position with an accuracy in the sub-micron range.

SUMMARY OF THE INVENTION

It is the object of the invention to secure the optical element at a well-defined location and in a well-defined position with extreme precision using a minimal number of parts and in which the optical assembly has a high mechanical stability.

To this end the retaining means comprise an elongate hollow body of triangular cross-section having three deformable side walls which adjoin each other, the optical element being secured to each of the side walls inside the body without play, at a well-defined location and in a well-defined position by rigid local connections.

Connection is possible in a manner known per se, for example by the use of an adhesive, or by laser welding or thermal compression.

The use of elongate hollow body of triangular cross-section as a retaining means has the advantage that a high torsional stiffness is achieved without taking additional steps. Another advantage is that the elongate hollow body in conjunction with the rigid connections guarantee an extra-ordinary high accuracy. This is because the optical element is secured in the optical assembly in a mechanically uniquely defined manner, the method of securing being free of hysteresis. Another advantage of the optical assembly in accordance with the invention is that temperature variations have only a slight and predictable influence on the fixed position of the optical element, which influences can be compensated for readily by optical measures. A further advantage is that the assembly in accordance with the invention can be manufactured rapidly and efficiently because of the small number of parts needed, which obviously reduces the manufacturing costs.

The optical assembly in accordance with the invention is very suitable for use in optical systems in which positional accuracies of the order of magnitude of a few tenths of a micron and angular accuracies of $10^{-4}$ to $10^6$ radians are required. Such systems are used in, for example, optical-disc players, such as Laser Vision players or Compact-Disc players employing optical elements such as lenses and semiconductor lasers.

It is to be noted that it is known from British Patent Application GB No. 1,556,476 to couple optical fibres detachably to one another by inserting the ends of each of the fibres into a deformable hollow prismatic element which is surrounded by a hydrostatic medium. The pressure exerted on all sides of the prismatic element by the hydrostatic medium deforms the walls of the prismatic element in such a way that they clamp said fibre ends in position. In comparison with the optical assembly in accordance with the invention this known construction has a number of disadvantages. One of these disadvantages is that the final position of the clamped-in fibre ends depends on the deformation of the prismatic element and the dimensional accuracy of the fibre ends. In the optical assembly in accordance with the invention the optical element can be fixed exactly in a predetermined position and the dimensional accuracy of the optical element is not essential. Another disadvantage of the known construction is that the fixing method is based on friction, so that said virtual play also occurs in this known construction. Yet another disadvantage is the necessity of the presence of a hydrostatic medium, which renders the construction intricate and therefore not suitable for many uses.

To obtain a wide positioning range, the elongate hollow body should be a thin-wall tube of triangular cross-section.

Where the optical element is of circular cross-section, the diameter should at least equal the diameter of the inscribed circle of the tube in the non-deformed condition. This assembly has the advantage that during manufacturing, when the optical element is positioned relative to the tube of triangular cross-section the optical element remains in contact with each of the three side walls of the tube, which facilitates securing the optical element to the side walls.

The connections may be at least substantially point-shaped contact spots between the optical element and the side walls of said body. Point-shaped contact spots enable constructional redundancy to be avoided. "Point-shaped contact spots" are to be understood to mean contact spots having dimension which are at least one order of magnitude smaller than the diameter of the elongate hollow body.

Where a second element is present, it is secured in the body in a way similar to the said optical element, each of the elements occupying an aligned position relative to the other element. In this way an optical assembly is optained in which two or more elements are secured relative to one another with a high accuracy.

To position and secure optical elements having the same diameter relative to one another, the body is suitably constituted by a thin-wall portion of a prismatic tube.

DETAILED DESCRIPTION OF THE PREFERRED EMBODIMENT

Figure 1:
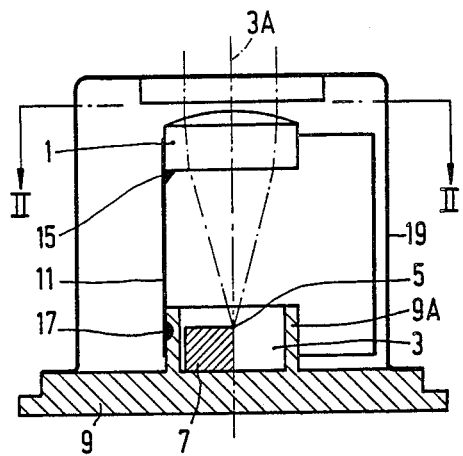
FIG. 1 is a longitudinal sectional view taken on the line I—I in FIG. 2.
Figure 2:
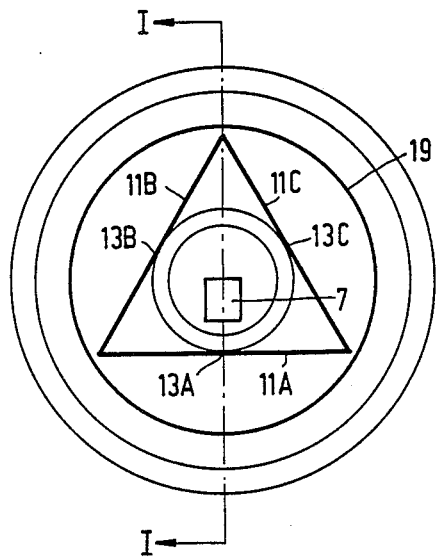
FIG. 2 is a sectional view taken on the line II—II in FIG. 1.

The embodiment shown in FIGS. 1 and 2 comprises optical elements constituted by an optical lens 1 and a laser unit 3. The laser unit 3 comprises a diode laser 5, a heat sink 7 and a base plate 9 with a cylindrical wall portion 9A. The laser unit 3, which has an optical axis 3A, and the lens 1 have the same outer diameter and are secured at a specific distance and in a well-defined position relative to one another by means of a thin-wall steel tube 11 of triangular cross-section. On account of its triangular cross-section the tube 11 has a high torsional stiffness, whilst the thin side walls 11A, 11B and 11C of the tube can act more or less as leaf springs, enabling limited laterally directed deformations of the side walls to be obtained. During manufacture of the optical assembly this deformability may be utilized for positioning the optical elements relative to each other. Preferably, the tube 11 therefore has an inscribed circle whose diameter is slightly larger than the outer diameter of the optical elements.

In the embodiment shown in FIGS. 1 and 2 the lens 1 is secured in the tube 11 at three locations, a small amount of a UV-curable adhesive 15 being applied between the lens 1 and the side walls 11A, 11B and 11C at the contact spots 13A, 13B and 13C respectively. The laser unit 3 is secured to each of the side walls 11A, 11B and 11C by a laser weld 17, only one of said welds being visible in the Figures.

Measurements have shown that in the optical assembly constructed as described above the thermal instability of the optical assembly is smaller than 0.03 mrad in a temperature range from 20° to 60° C. In the present example the optical assembly is provided with a sleeve 19 for mechanical and chemical protection of the lens 1 and the laser 5. The sleeve 19 is provided with a transparent window 19A.

Figure 3:
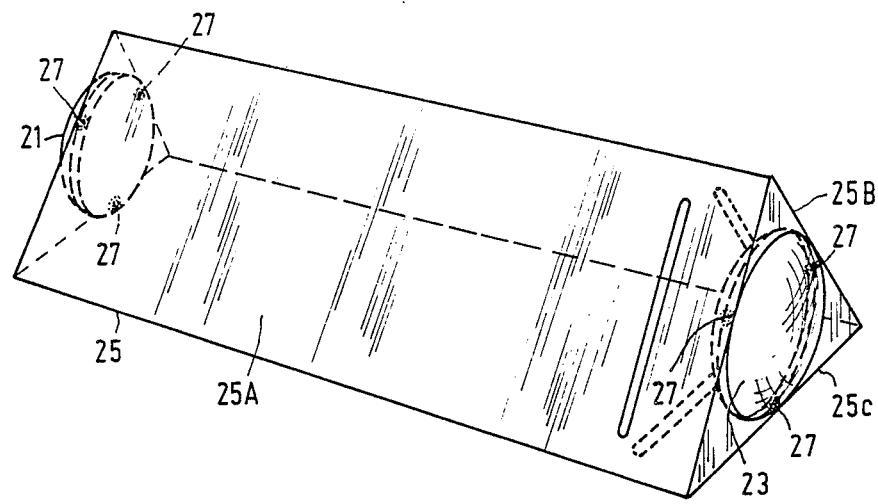
FIG. 3 is a perspective view of a second embodiment of the optical assembly.

The device shown in FIG. 3 comprises two optical elements being two lenses 21 and 23 of different diameter disposed on the same optical axis and a thin-wall body 25 of prismatic shape. The body 25 has three adjoining side walls 25A, 25B and 25C to which the lenses 21 and 23 are secured by means of small amounts of adhesive 27.

In this embodiment the mutual radial position of the optical elements is not or not significantly affected by variations in the temperature of the device or its environment, so that during operation of the device the orientation of the optical axis is not or not significantly changed. If stringent requirements are imposed on the positioning of the optical elements relative to each other, a possible axial displacement of the optical elements relative to each other under the influence of temperature variations can be reduced by a suitable choice of the expansion coefficients of the optical elements and the thin-wall portion, if applicable, in conjunction with the refractive indexes of the materials of the optical elements. The last mentioned measure results in a high degree of omnidirectional thermal stability of the device in accordance with the invention.

Figure 4:
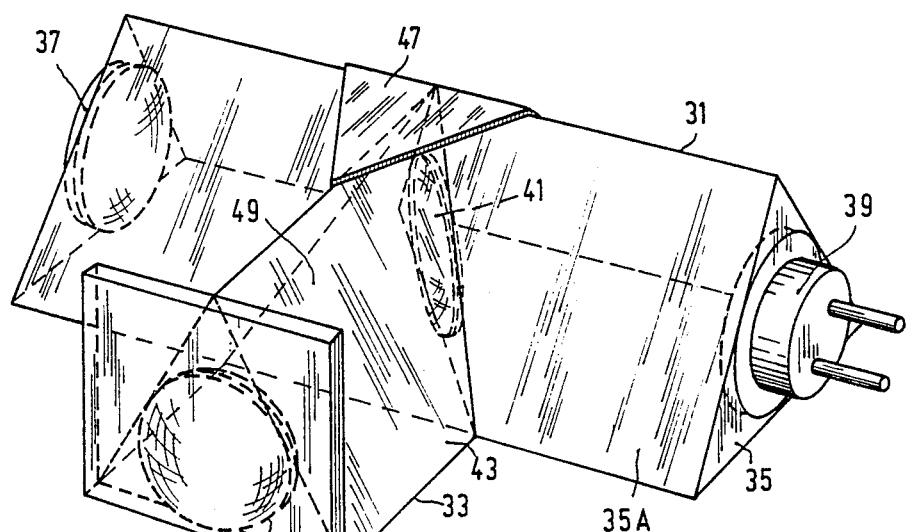
FIG. 4 is a perspective view of an optical structure in accordance with the invention.

The optical structure in accordance with the invention shown in FIG. 4 comprises two optical assemblies 31 and 33 in accordance with the invention, in which optical elements are secured in a manner as shown in the preceding Figures. The optical assembly 31 comprises a tube 35 of triangular cross-section, a lens 37, a semi-conductor laser 39 and a semitransparent mirror 41. The optical assembly 33 comprises a triangular tube 43 and a detector 45. Both optical assemblies 31 and 33 are rigidly connected to one another, a plate 47 being provided for increased rigidity. To enable the assemblies 31 and 33 to cooperate optically, the optical assembly 31 is provided with a window 49 which is disposed in the side wall 35A which faces the assembly 33. Obviously, the invention is not limited to the embodiments shown herein.

What is claimed is:

1. An optical assembly comprising retaining means and at least one optical element retained by said means, characterized in that the retaining means comprise an elongate hollow body of triangular cross-section having three deformable side walls which adjoin each other, the optical element being secured to each of the side walls inside the body without play at a well-defined location and in a well-defined position by rigid local connection.

2. An assembly as claimed in claim 1, characterized in that the body is constituted by a thin-wall tube of triangular cross-section.

3. An assembly as claimed in claim 2, the optical element being of circular cross-section, characterized in that at the location of circular cross-section the optical element has a diameter which is at least equal to the diameter of the inscribed circle of said tube in the non-deformed condition.

4. An assembly as claimed in claim 1, characterized in that the connections constitute at least substantially point-shaped contact spots between the optical element and the side walls of said body.

5. An assembly as claimed in claim 1, which in addition to said optical element comprises at least a second element, characterized in that the second element is secured in the body in a way similar to said optical element, each of the elements occupying stable position relative to the other element.

6. An assembly as claimed in claim 1, characterized in that the body is constituted by a thin-wall portion of a prismatic tube.

7. An optical structure comprising at least two optical assemblies as claimed in claim 1.

* * * * *